June 5, 1956 H. G. MOLINARI 2,748,538
HYPODERMIC NEEDLE AND CANNULA CLEANING APPARATUS
Filed April 1, 1954 5 Sheets-Sheet 2
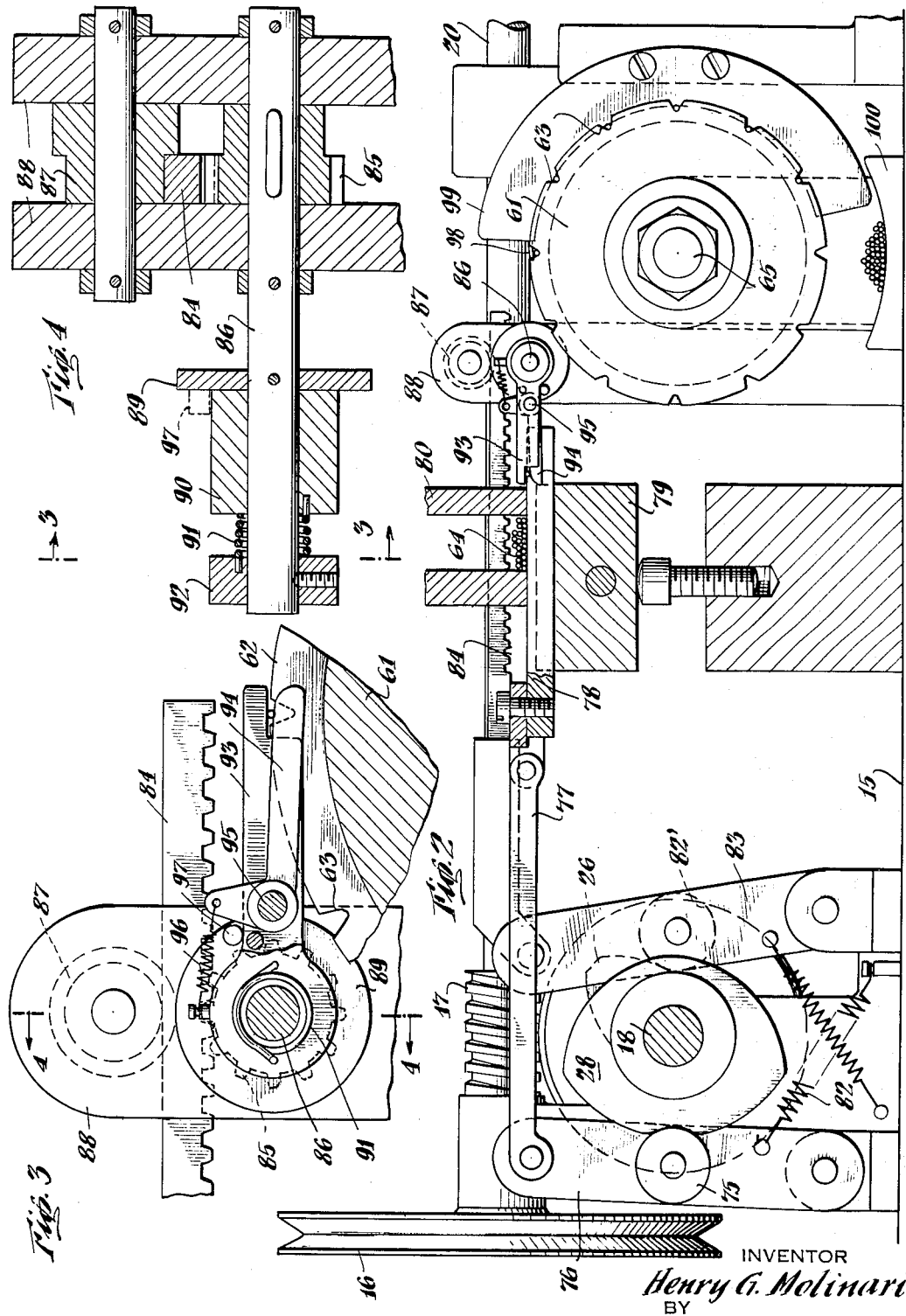
INVENTOR
Henry G. Molinari
BY
Kane, Dalsimer and Kane
ATTORNEYS

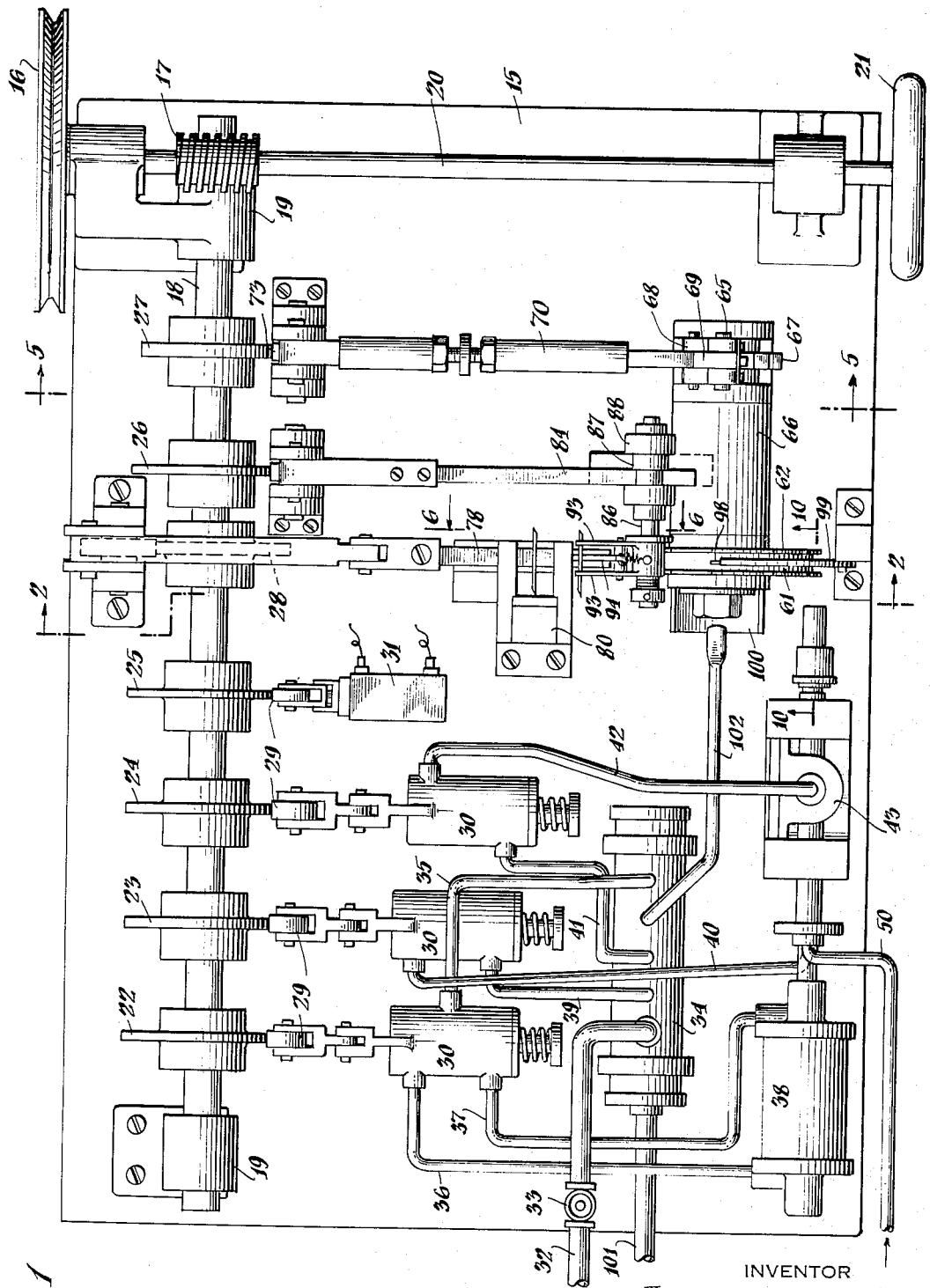

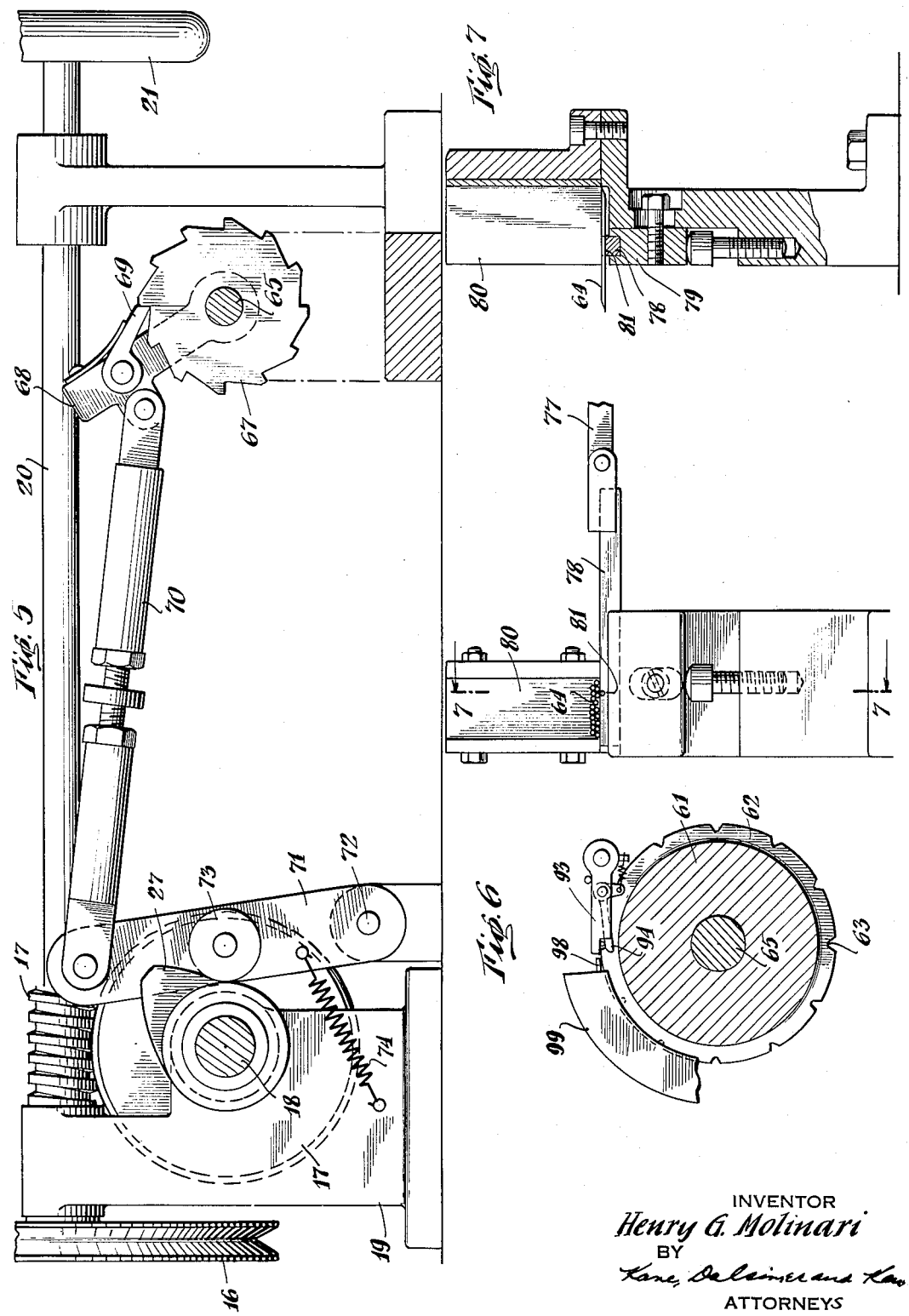

June 5, 1956  H. G. MOLINARI  2,748,538
HYPODERMIC NEEDLE AND CANNULA CLEANING APPARATUS
Filed April 1, 1954  5 Sheets-Sheet 4
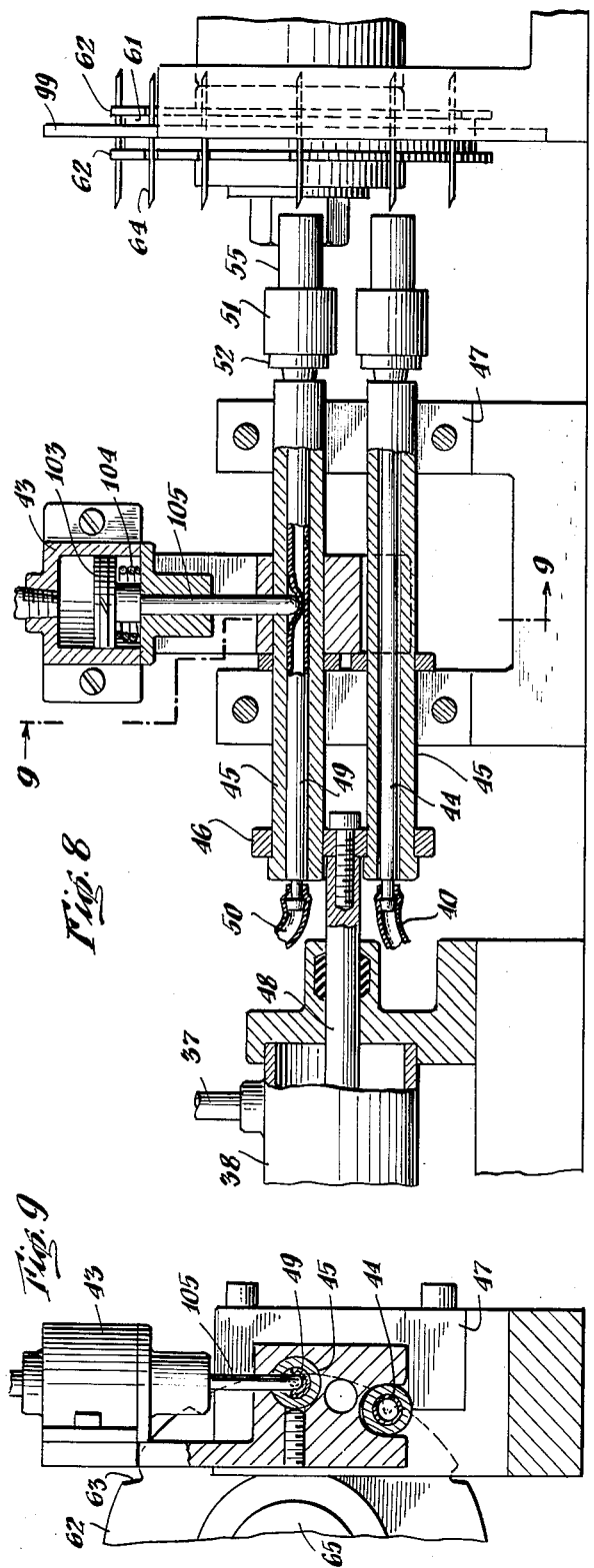
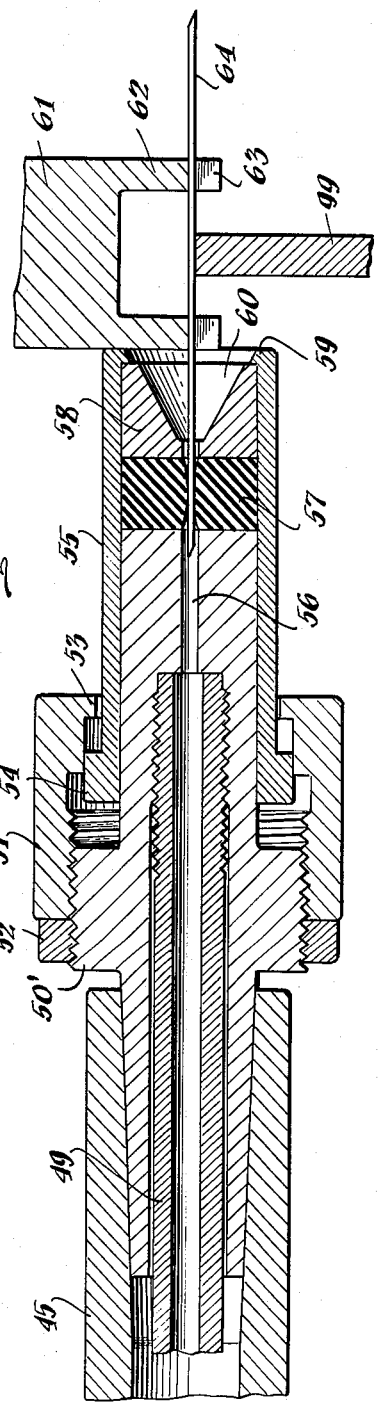
INVENTOR
Henry G. Molinari
BY
Kane, Dalsimer and Kane
ATTORNEYS

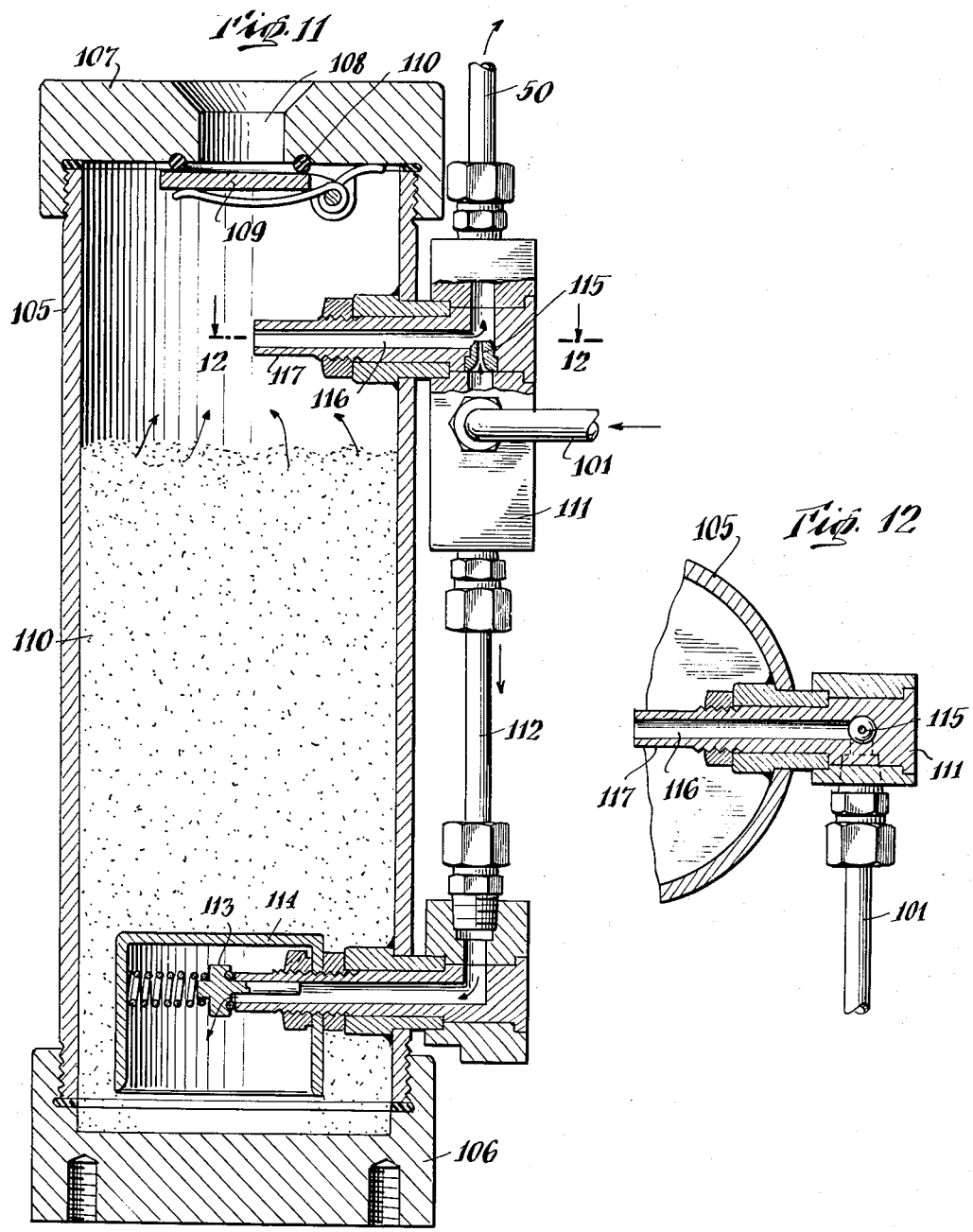

United States Patent Office 2,748,538
Patented June 5, 1956

2,748,538

HYPODERMIC NEEDLE AND CANNULA CLEANING APPARATUS

Henry G. Molinari, Rutherford, N. J., assignor to Becton, Dickinson and Company, Rutherford, N. J., a corporation of New Jersey Application April 1, 1954, Serial No. 420,423

15 Claims. (Cl. 51—15)

This invention relates to a structurally and functionally improved apparatus primarily intended for the cleaning of hypodermic needles and cannula although it may also be advantageously used in connection with the cleaning of units having physical characteristics similar to those of hypodermic needles.

It is an object of the invention to furnish an apparatus which will require a minimum of manual supervision and which will thus automatically operate on a succession of cannula or needles to clear the bores of the latter from obstructions and to also remove burrs which may exist adjacent their points. These burrs have usually come into existence as a consequence of point-forming and grinding operations. Therefore, after the needles have been treated by a machine constructed in accordance with the present teachings, they are ready to be combined with other parts (such as hubs) to furnish a complete needle assembly after which they are conveniently cleaned and sterilized in accordance with conventional procedure so as to be ready for use.

A further object is that of furnishing a machine which will include relatively few parts, each individually simple and rugged in construction, such parts being capable of ready assemblage to furnish a unitary apparatus operating over long periods of time with freedom from all difficulties.

With these and other objects in mind, reference is had to the attached sheets of drawings illustrating one practical embodiment of the invention and in which:

Fig. 1 is a plan view of a preferred form of apparatus:

Fig. 2 is a transverse sectional view taken along the line 2—2 in the direction of the arrows as indicated in Fig. 1;

Fig. 3 is a fragmentary view of a detail of the mechanism embodied in the machine taken along the lines 3—3 and in the direction of the arrows as indicated in Fig. 4;

Fig. 4 is a transverse sectional view taken along the line 4—4 in the direction of the arrows as indicated in Fig. 3;

Fig. 5 is a transverse sectional view taken along the line 5—5 in the direction of the arrows as indicated in Fig. 1;

Fig. 6 is a similar view taken along the line 6—6 in the direction of the arrows as also indicated in Fig. 1;

Fig. 7 is a further view of this type taken along the line 7—7 in the direction of the arrows as indicated in Fig. 6;

Fig. 8 is a side view, partly in section and showing one assembly of the apparatus;

Fig. 9 is a transverse sectional view taken along the line 9—9 in the direction of the arrows as indicated in Fig. 8;

Fig. 10 is a sectional side view showing in enlarged detail a portion of the apparatus taken along the line 10—10 in the direction of the arrows as indicated in Fig. 1;

Fig. 11 is a sectional side view of one form of abrasive-containing and distributing hopper or tank which may be associated with the apparatus; and Fig. 12 is a sectional plan view taken along the line 12—12 in the direction of the arrows as indicated in Fig. 11.

In the apparatus as hereinafter described, a suitable source of power (such as an electric motor) is employed to operate the main drive shaft of the mechanism. Controls form a part of the apparatus and serve to govern the operation of certain sub-assemblies as hereinafter brought out. According to one preferred aspect of the invention, these controls cause a functioning of units under the action of fluid pressure, such as compressed air. It is to be understood that such an arrangement is merely illustrative and that other sources of both primary and secondary power might be employed aside from the fact that the lay-out of the machanism generally and the detailed structure of its component elements might likewise be altered in numerous respects.

Thus, referring primarily to Fig. 1, the numeral 15 indicates the base of the machine which rotatably supports a drive in the form of, for example, pulley 16. The latter, by means of a worm and worm wheel assembly 17, rotates a main control shaft 18. This shaft rotates in bearings 19 upon the base. The shaft supporting the worm of assembly 17 may be continued as at 20 and provided with a hand wheel 21, by means of which it may be rotated to effect detailed adjustments and shiftings.

Supported upon shaft 18 are a series of cams 22 to 27 inclusive. Also, carried by this shaft is a cam 28 which as hereinafter brought out, serves to actuate a needle or similar slide. Followers 29 are operated by cams 22 to 25 inclusive. The followers cooperating with the first three of these cams cause an operation of valves controlling the flow of air and which valves are disposed within casings 30. The follower cooperating with cam 25 serves to operate a switch disposed within a casing 31.

A source of fluid under pressure, such as compressed air, is connected to a supply line 32. Flow through the latter may be controlled by a valve 33. This line is connected to a manifold 34. A line 35 extends from this manifold and connects with that casing 30 which is controlled by cam 22. Extending from that casing are tubes or lines 36 and 37 connected to the opposite ends of a cylinder 38.

A further supply line 39 extends from manifold 34 and connects with valve casing 30, the interior mechanism of which is controlled by cam 23. A return line 40 from this valve casing extends to a point adjacent cylinder 38. A still further supply line 41 extends from manifold 34 through to that valve casing 30, the interior mechanism of which is controlled by the operation of cam 24. Again, a return line 42 extends from this casing through to a cylinder 43.

Certain or all of these lines may be formed of flexible tubing and as shown especially in Fig. 8, line 40 connects with a tube 44 supported for reciprocation upon a slidably mounted carriage embracing conduits 45 and cross pieces 46. Tube 44 is disposed conveniently in the lower of conduits 45. The carriage is slidably mounted upon a block 47 attached to base 15. This carriage is reciprocated by being connected to the rod 48 extending into cylinder 38 and in turn connected with the piston (not shown) within that cylinder. A second tube 49 is disposed within the upper conduit 45 of the carriage. This tube is formed of natural or synthetic rubber and has connected to its rear or intake end a line 50 which is in turn connected to an abrasive-supplying tank which will hereinafter be described in detail. Tube 44 may likewise be formed of rubber although other materials can also be utilized.

The structures existing at the forward end of the carriage are preferably substantially identical. One of them has been shown in Fig. 10, which conveniently designates tube 49 as being housed within its conduit 45. The forward end of tube 49 is conveniently threaded and engaged with the thread of a plug 50', having an extension fitting into the forward end of conduit 45. This plug has its outer face threaded to mount a retaining nut 51 which may be secured against displacement by means of a lock ring 52. The forward end of the nut extends inwardly to furnish a portion 53 overlapping the base flange 54 of a cap 55, the end of which projects beyond nut 51. Plug 50', nut 51 and cap 55 are all preferably formed of metal. The forward end of plug 50' is formed with a bore 56 which is preferably of reduced diameter and aligned with the forward end of the bore forming a part of tube 49. Within cap 55 and beyond the forward portion of plug 50' is a collar 57 of displaceable material such as rubber. The bore of this collar may normally be of the same diameter as bore 56. Beyond the collar and within cap 55 is a block 58, again preferably formed of metal and which block has its end face overlapped by the inwardly turned end portion 59 of cap 55. Again this block is formed with a bore which is flared in a forward or outward direction as indicated at 60 to provide a guiding surface. The bore of this block aligns with the bores of collar 57 and plug 50'. As will be noted, the base portion 54 of the cap may, within limits, reciprocate within the nut bore between the base of plug 50' and the inturned part 53.

Beyond the reciprocating carriage a needle-supporting member is disposed. This carrier (Figs. 6 and 10) preferably takes the form of a wheel 61 having edge flanges 62 provided with notches 63 within which are received needles 64. Wheel 61 is mounted upon a shaft 65 supported by a thrust bearing within a housing 66 mounted upon base 15. This shaft as also shown in Fig. 5 mounts an annular ratchet 67 by means of which it is rotated. An arm 68 has rotatable bearing with the shaft and carries a spring-pressed pawl 69 engageable with the teeth of the ratchet. The arm 68 is connected by a rod 70 with a crank 71 pivotally supported on the base as at 72 and carrying a follower 73 which is engaged by cam 27. Conveniently rod 70 is split and provided with an adjustment structure such that its effective length may be increased or decreased.

A spring 74, or other expedient, extends between a portion of the base and arm 71 to maintain follower 73 in engagement with cam 27 and to normally urge link 70 to a retracted position. It is obvious that when this cam moves arm 71 in a clockwise direction as shown in Fig. 5, pawl tooth 69 will engage with one of the teeth of ratchet 67 to index the latter and shaft 65 through an arc of predetermined length. So rotated, shaft 65 will correspondingly move wheel 61. The amount of movement will be the distance between one and a successive pair of notches 63.

Referring especially to Figs. 1 and 2, it will be seen that cam 28 cooperates with a follower 75 which is carried by a crank 76 pivotally secured with respect to the base at a point to the rear of shaft 18. A link 77 is connected to the upper end of crank 76 and extends through to a slide 78 supported for lateral motion upon a block 79 the position of which may be adjusted vertically. Disposed above slide 78 is a hopper 80 which receives a supply of cannulae 64 to be cleaned. As especially shown in Figs. 6 and 7, slide 78 is formed with a transversely extending groove 81 having an area such that it may receive and retain one of these needles. Therefore, as slide 78 is reciprocated incident to the rotation of cam 28 and spring 82 attached to arm 76, the notch or groove 81 moves into the space below hopper 80 and a needle or cannula is transferred by gravity to the notch. Thereupon the slide is projected beyond the hopper or magazine 80 for a predetermined distance.

Forwardly of the hopper, a transfer mechanism is arranged to remove the needle 64 within notch 81 of slide 78 and to deposit it in one of the pair of notches 63 formed in the flange portions 62 of wheel 61. This mechanism is operated by cam 26 shown especially in Figs. 1 and 2. That cam engages a follower 82' supported upon a crank or arm 83 pivotally attached to base 15. A spring (not shown) corresponding to springs 74 and 82 assures engagement between the follower and cam. Crank arm 83 has pivotally connected with it a rack 84, the teeth of which mesh with a pinion 85 (see Fig. 3) supported upon a shaft 86. A roller 87 disposed between supports 88 bears against the upper edge of rack 84 and serves to assure that the teeth of the latter remain constantly in mesh with the teeth of pinion 85.

As especially shown in Fig. 4, shaft 86 has secured to it a collar 89. A hub 90 loosely encircles this shaft and has attached to it one end of a coil spring 91 disposed around the shaft. The second end of the spring is secured to a collar 92 also affixed to shaft 86. Hub 90 carries a pair of spaced arms 93 which lie one to each side of and beyond the flanges 62 of wheel 61. These arms, as especially shown in Fig. 3, have their outer ends reduced adjacent their lower edge portions. A second arm 94 in the form of a bell crank lever is pivotally supported as at 95 between arms 93. A spring 96 has one of its ends anchored against movement with respect to hub 90. Its opposite end is connected to the short arm of bell crank lever 94. A pin 97 conveniently supported by collar 89 serves to limit the movement of finger 94.

With the parts properly timed, it is apparent that slide 78 will be projected to have its transverse notch or groove 81 shift from a position underlying hopper or magazine 80 to a point where the needle supported within that notch will have its ends ride between the fingers 93 and 94 between which it will be gripped at substantially opposite points in its surface. Wheel 61 will be indexed so that one of its pair of notches 63 will lie in the plane of the upper face of the slide. At that instant, rack 84 will be actuated to cause hub 90 and fingers 93 and 94 to traverse an arcuate path such that their ends will be disposed as in Fig. 3 and with the needle gripped by those ends extending into the pair of notches 63. Thereupon, by a further indexing of wheel 61, the edges of these notches will be caused to engage the needle and shift the latter from between the fingers 93 and 94.

It is to be remembered that the periphery of wheel 61 is defined by spaced flanges 62. Therefore, arm 94 may be accommodated within the groove thus provided, the arms 93 lying beyond these flanges. Thus, that needle is adequately supported in its transfer from the slide to the wheel. While a double ended needle has been shown, it is obvious that a needle embracing a hub at one end might also be cleaned by the present machine. In that case, the pointed needle end would face to the left as viewed in Fig. 8. A wire 98 as shown in Fig. 6 may be disposed to overlie the periphery of wheel 61 at a point immediately beyond the transfer station. This will assure against any accidental displacement of a cannula from a pair of notches 63 incident to vibration or otherwise. Beyond this wire, a guide 99 of arcuate configuration may overlap the peripheral edges of flanges 62 to a slight extent and as especially shown in Fig. 10 to assure of a retention of the needle within its pair of notches. This structure has also been shown in Fig. 2 in which there has additionally been illustrated a receiving portion 100 underlying the wheel and into which the needles are deposited.

The terminals of the switch structure enclosed within casing 31 are connected to a source of current supply and to a vibrator mechanism which preferably forms a part of the abrasive-supplying tank as hereinafter described. A line 101 (Figs. 1 and 12) may extend from the manifold casing 34 through to that abrasive tank. Additionally, a line 102 may extend from the manifold to a point adjacent wheel 61; this line constantly supplying air under pressure through, for example, a nozzle which plays the air jet on the wheel at a point beyond that at which the transfer station of the needles is provided. As afore brought out, line 42 is connected to cylinder 43. Within the latter, as in Fig. 8, a piston 103 is disposed which is normally urged to a retracted position by a spring 104. That piston has secured to it a rod 105 which extends through the opening in conduit 45 to a point overlying tube 49. When piston 103 is projected and rod or stem 105 is similarly shifted, the end of the latter will pinch or compress tube 49 at a point in line with this stem to thus function as a valve and interrupt a flow of abrasive-laden air through the latter.

Attention is now invited to Figs. 11 and 12 in which a preferred form of abrasive-receiving and supplying tank has been illustrated. It will be seen that the air-supplying line has been indicated at 101. Additionally at 50, there has been indicated the line which supplies abrasive-laden air to the apparatus. The tank preferably includes a body 105 of any preferred configuration closed at its lower end by a base 106 and at its upper end by a cap 107. The latter may be formed with an opening 108 through which abrasive powder 110 may be introduced into the tank interior to the depth indicated. This opening is normally closed by means of a spring-pressed gate or plate 109; a seal 110 being conveniently furnished to render the interior of the tank at this point substantially leakproof.

Air supply line 101 connects with a fixture 111 within which a divided flow of air occurs. One air path is defined by tube 112 extending downwardly from fixture 111 and also through the wall of the tank into the interior of the same. At that point, a spring-pressed valve 113 may be provided so as to prevent a flow of any fluid or material into the lower end of tube 112. A casing 114 preferably encloses this valve and the end of line 112. That casing is spaced from the upper face of base 106.

The second flow path of air supplied through tube 101 is defined by a nozzle 115 extending in an upward direction and projecting into a space 116 in communication with line or tube 50. This space presents constricting surfaces such that a venturi-like action occurs. A branch line 117 also communicates with this space in advance of nozzle 115 and has its inner end extending into tank 105 at a point above the body of material 110.

It is thus obvious that with air under pressure supplied through line 101, that air will flow upwardly through nozzle 115 and also downwardly through line 112. Incident to the latter flow, it will unseat valve 113 and pass through casing 114 as indicated by the arrows and around the lower edges of that casing. Thence it will flow through the body of abrasive 110 and emerge from the upper surface of the same laden with abrasive powder. The flow will continue through line 50 incident to passing through branch 117. As it emerges from that branch into the venturi chamber 116, it will merge with the relatively high velocity flow or discharge occurring from nozzle 115. Therefore, the abrasive will be evenly dispersed throughout the body of air flowing through tube 50 and a proper mixture suitable for cleaning the cannula will be furnished. While not shown, tank 105 and its associated parts may be mounted upon a vibrating mechanism such as a coil or motor unit. This, when energized, will subject the abrasive body 110 to agitation such that it will not compact but rather remain friable and loose so that air may seep up through it after the air has flowed beyond casing 114.

Now considering the operation of the apparatus, it will be assumed that abrasive has been disposed in tank 105 or an equivalent unit and that this tank has been connected to a source of air under pressure as well as to line 50. Also it will have been assumed that a suitable vibrator mechanism may have been associated with the tank. A line such as 32 supplying air under pressure to manifold 34, will have also been established and valve 33 will have been opened. Moreover, cannulae will have been disposed within magazine or hopper 80. These cannulae as shown may be double-ended or else single-ended. Also, they may be provided with hub portions or be otherwise designed in accordance with the techniques demanded by the medical profession. A source of motive power will have been connected to, for example, pulley 16 to rotate shaft 18 and a source of electric current supply will have been connected to the terminals of switch housing 31 and the aforementioned vibrator mechanism associated with the abrasive supply.

Under these circumstances, cam 28 will rotate to reciprocate slide 78 and thus transfer one of the needles by means of its groove or notch 81 from a position adjacent the base of hopper 80 to a point beyond the latter. Cam 26 will effect a reciprocation of rack 84. This will cause the transfer mechanism embracing fingers 93 and 94 to oscillate. At one extreme of their movement, they will receive between them the needle carried by the slide. At their opposite extreme of movement, they will deposit that needle within a pair of the notches 63 and with the ends of the needle extending beyond the side faces of wheel 61.

As wheel 61 is indexed, the last-transferred needle will move with the latter. Such indexing or intermittent feeding of the wheel occurs as a consequence of cam 27 reciprocating link 70. As the latter moves, it rocks crank 68 to cause pawl 69 to sequentially engage the teeth of ratchet 67. That ratchet being secured to shaft 65, it follows that the wheel 61 also secured to the same will be indexed in the desired manner; it being understood that all of these parts as well as the parts hereinafter referred to, are timed through adjustments of their cams or otherwise to operate at given instants in the cycle of revolution of shaft 18.

Cam 22 serves to control the action of the valve mechanism within housing 30. That housing is supplied from manifold 34 through line 35. Thus, as the follower 29 cooperating with this cam is caused to function, air will be alternately supplied or exhausted through lines 36 and 37. Consequently, air under pressure will be supplied alternately to opposite ends of cylinder 38. This will cause rod 48 to be reciprocated which will in turn result in similar movement on the part of the carriage embracing conduits 45 and cross pieces 46. Thus, at one extreme movement of this carriage, caps 55 will be projected to the position shown in Fig. 8 at which they clear the ends of the cannula 64. At the opposite extreme of carriage movement, caps 55 will bear against the adjacent side face of wheel 61 as shown in Fig. 10.

It will be observed that the parts are so arranged that tube 44 and especially the axes of the plug 50′, collar 57 and block or plug 58 are aligned with a cannula carried by wheel 61 when the latter is in a position of rest. Similarly the axes of tube 49, its plugs and collars are aligned with the end of a needle occupying a position on wheel 61 preceding that of the needle which is aligned with tube 44. It therefore follows that when the carriage is projected by plunger 48 and with the wheel 61 in a position of rest, the ends of two cannulae will be in alignment with the axes of the two caps 55. Accordingly, as these caps and their associated parts project, the adjacent ends of the needles pass into the bores 56 as shown in Fig. 10. This projection will continue until the ends of caps 55 bear against the side face of wheel 61. Accordingly, under the thrust exerted, caps 55 will move inwardly as shown in Fig. 10 thereby compressing collars 57 and displacing the material thereof to constrict the bores of the latter as shown in this figure. Therefore, a substantially air-tight seal will be established between the collar bores and the outer faces of the needles with the inner ends of the latter extending inwardly beyond the collars.

Abrasive laden air is supplied through tube or line 50. This air can constantly flow through tube 49. However, as a consequence of the valve mechanism furnished by stem or plunger 105, that flow is periodically interrupted. The movement of plunger 105 is controlled by, for example, air supplied through line 42. That line is connected with valve casing 30 which is connected with manifold 34 by line 41. The action of the valve mechanism is controlled by cam 24. Thus, as shaft 18 revolves, the flow of abrasive-laden air through the cannula in line with the axis of tube 49 will occur for a predetermined interval; the duration of which is established by the period of movement of piston 103. Likewise, the flow of clean air for the purpose of removing residual abrasive and foreign materials which have not been removed by the preceding flow, will occur through tube 44 supplied by line 40. The latter is connected to valve casing 30 which is supplied by line 39, connected to manifold 34. The valve mechanism in this casing 30 has its operation controlled by cam 23. Finally, cam 25 will control the opening and closing of switch 31. This cam is so timed that the vibrator associated with tank 105 is energized as air flows through tube 49. Obviously coincident with such flow air is supplied to the tank through line 101.

Thus it is apparent that an apparatus is provided which may be furnished with a number of cannulae from which fins are to be removed and the bore surfaces of which are to be cleaned. These cannulae are automatically transferred to stations at which they are successively subjected to the action of an abrasive air blast and a cleaning air blast. Thereafter they are deposited in a suitable receptacle. Obviously an indexing of wheel 61 occurs only when the carriage carrying tubes 44 and 49 is in retracted position. Likewise, it is only in that position that an interruption to flow through tube 49 occurs. Air wastage is reduced to a minimum as is also the wastage of abrasive. The apparatus is relatively quite simple and, in effect, automatic in operation.

Thus, among others, the several objects of the invention as specifically aforenoted are achieved. Obviously, numerous changes in construction and re-arrangements of the parts might be resorted to without departing from the spirit of the invention as defined by the claims.

I claim:

1. A hypodermic needle cleaning apparatus including in combination means to receive and retain a cannula, automatic means to feed said cannula into said retaining means, means for conducting an abrasive blast through and beyond the cannula bore and means for automatically shifting said retaining means with respect to said blast-conducting means.

2. A hypodermic needle cleaning apparatus including in combination means to receive and retain a cannula, automatic means to feed said retaining means, means for conducting an abrasive blast through and beyond the cannula bore, means for subjecting said cannula to a flow of cleaning fluid and means for automatically shifting said retaining means with respect to said blast-conducting means and also said fluid-flow producing means.

3. A hypodermic needle cleaning apparatus including in combination a nozzle, means movably supporting a cannula to align with and be shifted to one side of said nozzle, a member associated with said nozzle and presenting a bore into which the cannula is extendable and means for periodically constricting said bore to cause substantial sealing contact to be effected between the outer cannula face and said member.

4. A hypodermic needle cleaning apparatus including in combination a nozzle, means movably supporting a cannula to align with and be shifted to one side of said nozzle, a member associated with said nozzle and presenting a bore into which the cannula is extendable, means for periodically constricting said bore to cause substantial sealing contact to be effected between the outer cannula face and said member and means functioning in response to engagement being effected between said nozzle and mounting means for rendering said last-named means operative.

5. A hypodermic needle cleaning apparatus including in combination a carriage, a pair of nozzles mounted by said carriage, means for supporting a cannula to move adjacent said nozzles, means for moving said carriage to have said cannula enter the bore of the nozzle; means for connecting one of said nozzles with a source of abrasive-laden air and means for connecting the second of the same with a source of cleaning air.

6. A hypodermic needle cleaning apparatus including in combination a carriage, a pair of nozzles mounted by said carriage, means for supporting a cannula to move adjacent said nozzles, means for moving said carriage to have said cannula enter the bore of the nozzle; means for connecting one of said nozzles with a source of abrasive-laden air, means for connecting the second of the same with a source of cleaning air, means for shifting said supporting means to successively align a cannula carried thereby with said nozzles and said latter means being operative solely upon said carriage moving away from said cannula.

7. A hypodermic needle cleaning apparatus including in combination a carriage, a pair of nozzles mounted by said carriage, means for supporting a cannula to move adjacent said nozzles, means for moving said carriage to have said cannula enter the bore of the nozzle; means for connecting one of said nozzles with a source of abrasive-laden air, means for connecting the second of the same with a source of cleaning air, means for shifting said supporting means to successively align a cannula carried thereby with said nozzles, said latter means being operative solely upon said carriage moving away from said cannula and means for interrupting the flow of air through at least said abrasive-carrying nozzle when said carriage is in such latter position.

8. A hypodermic needle cleaning apparatus including in combination a carriage, a pair of nozzles mounted by said carriage, means for supporting a cannula to move adjacent said nozzles, means for moving said carriage to have said cannula enter the bore of the nozzle; means for connecting one of said nozzles with a source of abrasive-laden air, means for connecting the second of the same with a source of cleaning air, means for shifting said supporting means to successively align a cannula carried thereby with said nozzles, said latter means being operative solely upon said carriage moving away from said cannula, means associated with said abrasive-carrying nozzle to sealingly engage a cannula aligned therewith and means for rendering said last-named means operative solely when said carriage is projected toward said cannula.

9. A hypodermic needle cleaning apparatus including in combination a nozzle for conducting abrasive-laden air, shiftable means for supporting a cannula in line with said nozzle, means whereby said nozzle is ensleeved over said cannula, an abrasive-containing tank to receive air under pressure and connected to said nozzle-supplying means and means for vibrating said tank upon air flowing through said nozzle.

10. A hypodermic needle cleaning apparatus including in combination a nozzle for conducting abrasive-laden air, shiftable means for supporting a cannula in line with said nozzle, means whereby said nozzle is ensleeved over said cannula, an abrasive-containing tank to receive air under pressure and connected to said nozzle-supplying means, means for interrupting a flow of air through said nozzle and means causing a vibration of said tank and functioning solely upon air flow occurring through said nozzle.

11. A needle cleaning apparatus including in combination a nozzle for conducting abrasive-laden air, shiftable means for supporting a cannula in line with said nozzle, means whereby said nozzle is physically coupled with said cannula, an abrasive-containing tank to receive air under pressure and connected to said nozzle-supplying means, means for interrupting the flow of air from tank to said nozzle, said tank comprising a hollow body to receive abrasive to a predetermined depth, a line supplying air under pressure to said tank adjacent the lower end of the same, a fitting connected to said source, a nozzle associated with said fitting, a tube extending into the interior of said tank at a point above the body of abrasive, said tube extending to a point adjacent said nozzle to conduct abrasive-laden air to a point beyond the latter and said supplying means for said first-named nozzle being connected to the space defined by said point.

12. A cleaning apparatus including, in combination, a needle supporting member, means for delivering needles thereto, a nozzle for discharging a needle cleaning fluid, means for shifting said member and nozzle with respect to each other to cause a hypodermic needle supported by the former to enter and then be retracted from the bore of the latter and during the period of its ensleevement by the nozzle to have its lumen act as a passage for cleaning fluid, and means functioning after the retraction of the needle from the bore of the nozzle for thereupon moving said supporting member to shift the clean needle from a position aligned with said nozzle.

13. A cleaning apparatus as specified in claim 12, a further nozzle disposed beyond said first nozzle and with which the needle carried by said supporting member is subsequently aligned, and means for delivering through said last-named nozzle a cleaning fluid having characteristics different than that discharged from said first nozzle.

14. A cleaning apparatus as specified in claim 12, said delivering means comprising a hopper receiving a plurality of needles, feeding means movable with respect to said hopper for withdrawing a needle therefrom, and a transfer mechanism for conveying a needle from said feeding means to said needle supporting member.

15. A cleaning apparatus as specified in claim 12, and means associated with said nozzle to grip and seal against the exterior surfaces of a needle while the latter is ensleeved therein.

References Cited in the file of this patent

UNITED STATES PATENTS

| | | |
|---|---|---|
| 1,121,308 | Thomas | Dec. 15, 1914 |
| 2,029,424 | Hill | Feb. 4, 1936 |
| 2,050,422 | Dalkowitz | Aug. 11, 1936 |
| 2,336,394 | Dreisbach | Dec. 7, 1943 |
| 2,408,204 | Early | Sept. 24, 1946 |
| 2,528,146 | Hubert | Oct. 31, 1950 |
| 2,565,341 | Arispe | Aug. 21, 1951 |
| 2,571,904 | Lofgren | Oct. 16, 1951 |
| 2,582,537 | Flateboe | Jan. 15, 1952 |
| 2,631,413 | Platt | Mar. 17, 1953 |
| 2,661,537 | Angell | Dec. 8, 1953 |
| 2,665,689 | Butler | Jan. 12, 1954 |